United States Patent
Steinbok et al.

(10) Patent No.: US 9,571,595 B2
(45) Date of Patent: Feb. 14, 2017

(54) EMPLOYMENT OF PRESENCE-BASED HISTORY INFORMATION IN NOTEBOOK APPLICATION

(71) Applicant: Microsoft Corporation, Redmond, WA (US)

(72) Inventors: Nicole Steinbok, Seattle, WA (US);
Daniel Escapa, Bellevue, WA (US);
David Tse, Kirkland, WA (US);
Thomas Wionzek, Kirkland, WA (US);
Olya Veselova, Redmond, WA (US);
David Rasmussen, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 229 days.

(21) Appl. No.: 14/109,240

(22) Filed: Dec. 17, 2013

(65) Prior Publication Data
US 2015/0172402 A1  Jun. 18, 2015

(51) Int. Cl.
*G06F 15/16* (2006.01)
*H04L 29/08* (2006.01)
*G06Q 10/10* (2012.01)

(52) U.S. Cl.
CPC ............ *H04L 67/24* (2013.01); *G06Q 10/101* (2013.01)

(58) Field of Classification Search
CPC .......... H04L 67/24; G06Q 10/00; G06Q 50/01
USPC ................................................. 709/205, 203
See application file for complete search history.

(56) References Cited

U.S. PATENT DOCUMENTS

| 7,945,622 | B1 | 5/2011 | Pegg | |
| 2005/0289453 | A1* | 12/2005 | Segal | G06F 1/12 715/203 |
| 2006/0053195 | A1 | 3/2006 | Schneider et al. | |
| 2009/0037400 | A1* | 2/2009 | Cragun | G06F 17/30699 |
| 2009/0144283 | A1* | 6/2009 | Clark | G06F 17/30144 |
| 2009/0164912 | A1 | 6/2009 | Barber et al. | |

(Continued)

OTHER PUBLICATIONS

"Written Opinion Issued in PCT Application No. PCT/US2014/069633", Mailed Date: Aug. 18, 2015, 7 Pages.
"International Search Report and Written Opinion Issued in PCT Patent Application No. PCT/US2014/069633", Mailed Date: Feb. 24, 2015, 11 Pages.
Carroll, et al., "Notification and Awareness: Synchronizing Task-Oriented Collaborative Activity", In International Journal of Human-Computer Studies, vol. 58, Issue 5, May 2003, 28 pages.

(Continued)

*Primary Examiner* — Duyen Doan
(74) *Attorney, Agent, or Firm* — Monica Adjemian; Tom Wong; Micky Minhaus

(57) ABSTRACT

To employ presence-based history information in conjunction with a notebook application, presence information for one or more users associated with a notebook application is determined from a variety of presence services. One or more interactions of the users are tracked in conjunction with a location within the notebook to record history information associated with the one or more users. The history information may be presented to the users through a user interface in conjunction with a location within the notebook application or through a separate user interface. The presented history information may include the recorded history information and statistical information based on the recorded history information. The users may interact with the user interface to employ the presented presence-based history information in conjunction with contents of the notebook application. For example, replay of user interactions in conjunction with a location within the notebook application may be enabled.

20 Claims, 9 Drawing Sheets

(56) References Cited

U.S. PATENT DOCUMENTS

| | | | |
|---|---|---|---|
| 2010/0299615 A1 | 11/2010 | Miluzzo et al. | |
| 2011/0078602 A1* | 3/2011 | Gammon | G06F 17/30539 715/769 |
| 2011/0231409 A1* | 9/2011 | Dhara | H04L 12/1818 707/748 |
| 2011/0296000 A1 | 12/2011 | Ferris et al. | |
| 2011/0307772 A1* | 12/2011 | Lloyd | G06F 17/2247 715/212 |
| 2011/0314482 A1 | 12/2011 | Cupala et al. | |
| 2012/0117457 A1 | 5/2012 | Yuniardi | |
| 2012/0233137 A1 | 9/2012 | Jakobson et al. | |
| 2013/0185651 A1 | 7/2013 | Wionzek et al. | |
| 2013/0198600 A1* | 8/2013 | Lockhart | G06F 17/241 715/230 |
| 2013/0212250 A1* | 8/2013 | Kleppner | G06Q 10/10 709/224 |
| 2013/0247004 A1* | 9/2013 | DeLuca | G06F 15/16 717/120 |
| 2014/0351320 A1* | 11/2014 | Gao | H04L 67/1095 709/203 |

OTHER PUBLICATIONS

Vogel, Jurgen, "Conflict Visualization for Collaborative Multi-user Applications", In Proceedings of Reihe Informatik TR-04-003, Dec. 8, 2004, 8 pages.

Manohar, et al., "Replay by Re-execution: a Paradigm for Asynchronous Collaboration via Record and Replay of Interactive Multimedia Sessions", In Proceedings of Newsletter of ACM SIGOIS Bulletin, Aug. 1994, 6 pages.

Horain, et al., "Enhancing the Perception of Collaborative Actions with Virtual Gestures", Published on: Nov. 13, 2006, Available at: http://www.cs.utah.edu/~piyush/recent/collaborativeAFVR06.pdf.

Mitchell, Alex, "Communication and Shared Understanding in Collaborative Writing", In Thesis for the Degree of Master of Science, May 23, 2013, 174 pages.

International Preliminary Report on Patentability Issued in PCT Patent Application No. PCT/US2014/069633, Mailed Date: Jan. 21, 2016, 8 Pages.

* cited by examiner

EMPLOYMENT OF PRESENCE-BASED HISTORY INFORMATION IN NOTEBOOK APPLICATION

BACKGROUND

A notebook may include a collection of documents having common theme for a user to keep track of and edit. For example, a notebook may be recorded that corresponds to a project. The notebook may have different tabs associated with different sections, and those sections may include, for example, a section marketing research, a section for specification(s), a section for meeting notes and schedules, and a home page that generally describes the project. Each of the sections may include different pages, and each page may include one or more documents. The documents may include spreadsheets, word processing documents, emails, calendars, presentations, and any other document that may be part of the project. Thus, a notebook may represent a knowledge base that includes a wide variety of different documents, and even different types of documents.

In a collaborative environment, multiple users may access, view, and edit any of the sections, pages, and/or documents within the notebook. Having multiple users maintain separate copies of and/or periodically consolidate copies of the same notebook may result in degraded user experience. Users may not be able to take advantage of capabilities of the collective environment provided by the notebook application.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to employing presence-based history information in conjunction with a notebook application. Presence information may be obtained from a variety of presence services, such as a communication application, a social or professional network, and a presence module of the notebook application to determine the presence information for one or more users associated with a notebook application. One or more interactions of the users may then be tracked in conjunction with a location within the notebook application to record history information associated with the users. The history information may be presented to the users through a user interface in conjunction with a location within the notebook application or through a separate user interface. The presented history information may further include statistical information based on the recorded history information for the same notebook and/or other notebooks. The users may then be enabled to interact with the user interface to employ the presented presence-based history information in conjunction with contents of the notebook application. In one embodiment, the presented presence-based history information may enable the users to replay user interactions in conjunction with contents of the notebook application.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
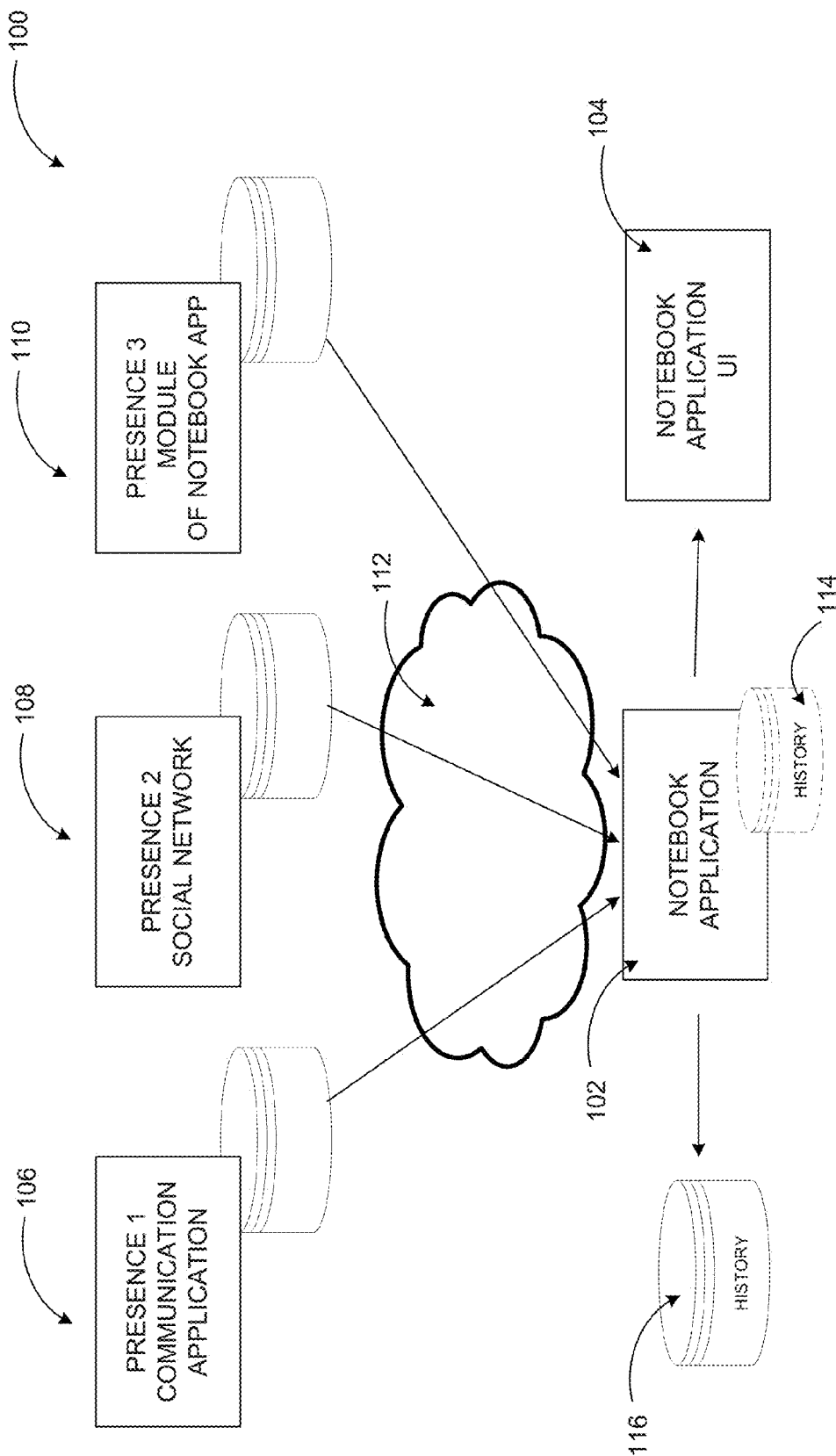
FIG. 1 includes a conceptual diagram illustrating an example method to employ presence-based history information in conjunction with a notebook application.

As briefly described above, to employ presence-based history information in conjunction with a notebook application, presence information may be determined for one or more users associated with a notebook application. One or more interactions of the users may then be tracked in conjunction with a location within the notebook application to record history information, which may be stored in a data store. The history information may be retrieved from the data store and presented to the users through a user interface associated with the notebook application. The history information presented may also include statistical information based on the recoded history information. The users may then be enabled to interact with the user interface to employ the presented history information in conjunction with contents of the notebook application.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for employment of presence-based history information in conjunction with a notebook application. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes a conceptual diagram illustrating an example method to employ presence-based history information in conjunction with a notebook application. A notebook application 102 may be coupled to one or more presence services (e.g., 106, 108, and 110) via a cloud 112 to determine presence information for users associated with the notebook application 102. Example presence services may include a communication application 106, a social network 108, a professional network, and a presence module 110 of the notebook application.

The notebook application 102 may track one or more interactions of the users in conjunction with a location within the notebook application 102 to record presence history information associated with the users. History of user interactions with other notebooks may also be retrieved from a data store (e.g., data store 116) to be presented to users of the notebook. The recorded history information may include a frequency of the interactions, an occurrence of the interactions, and/or a type of the interactions. The types of interactions may include editing, viewing, and/or communicating within a document, object, file, page, section, and/or notebook of the notebook application 102. For example, the notebook application 102 may track a number of edits and a type of edits, such as an addition, deletion, and/or modification, made by a user to a specific page within a section of a notebook within the notebook application 102. The recorded history information may be stored within a data store. The data store may be a data store 114 located within the notebook application or a separate data store 116.

In some embodiments, the notebook application may track one or more interactions of one or more users associated with other notebooks within the notebook application to record history information associated with those users.

The history information may be retrieved from the data store (114, 116) in response to a request from the notebook application 102, and the notebook application 102 may present the history information to the users through a user interface 104 associated with the notebook application 102. The history information may be presented through a user interface in conjunction with a location within the notebook application, such as a document, an object, a file, a page, a section, and/or a notebook, or as a separate user interface. Furthermore, the presence-based history information may be presented using a textual scheme, a graphical scheme, an audio scheme, an animation scheme, a coloring scheme, a highlighting scheme, and/or a shading scheme to enhance the presentation of the history information in the user interface.

The presented history information may include one or more of an occurrence, a frequency, and a type of views, edits, and/or communications associated with the users in conjunction with a location within the notebook application. The presented history information may also include statistical information based on the recorded history information. The statistical information may include how many times one or more of a document, an object, a file, a page, a section, and a notebook was linked; one or more of a document, an object, a file, a page, a section, and a notebook with most views, edits, and communications; and an average viewing and editing time for one or more of a document, an object, a file, a page, a section, and a notebook. Additional statistical information, such as changes in size and an age of one or more of a document, an object, a file, a page, a section, and a notebook may also be presented.

Using the presented history information, the notebook application may automatically adjust a frequency of collaborative updates on documents, objects, files, pages, sections, and or notebooks based on how frequently they are viewed and/or edited. Furthermore, the notebook application may automatically suggest to a user one or more documents, objects, files, pages, sections, and/or notebooks to view based on the history information in conjunction with a location within the notebook application. In one example, users may use the history information to prioritize a document, object, file, page, section and/or notebook that is presented as having frequent views and/or edits. In another example, the history information presented may enable the users to see which documents, pages, sections, and/or notebooks have seldom been viewed or edited and the users may choose to clean up the notebook application to rid of those documents, objects, files, pages, sections, and or notebooks. The users may also choose to rediscover those documents, objects, files, pages, sections, and/or notebooks.

In some embodiments, the notebook application 102 may enable replay using the history information. The users may select an actionable link provided within the presented history information to view a replay of edits made by one or more users to a document, object, file, page, section, and or notebook within the notebook application 102 through the user interface 104. For example, additions, deletions, modifications and/or comments made to a document by a user may be replayed through the user interface 104. Additions, deletions, modifications and/or comments made to the document by another user may also be replayed through the user interface 104. The replay feature may enable users to view how a document, page, section, notebook, and/or notebook application has evolved and changed over time and which users were key editors of the document.

The users may be enabled to interact with the user interface 104 to use the presented history information by hovering over or selecting a user interface element using a tap action, a swipe action, a mouse, a pen input, and/or a keyboard input. Initially, the history information presented may be top-level statistical information and by interacting with the user interface 104, the users may be presented more detailed history information, such as user-specific history and interaction-specific history. A user may be enabled to define the history information to be presented through the interface to the user. For example, the user may only want the history information associated with team members working on a specific section in a notebook to be presented. A user may further be enabled to set credential based or permission based limitations on the history information that may be presented to the other users through the user interface 104. For example, the user may not allow communication-based interactions in conjunction with a location within the notebook application to be presented to users other than team members working on a specific section in a notebook to be presented.

The example system in FIG. 1 has been described with specific applications, user interface presentations, and user interactions to employ presence-based history information in a notebook application. Embodiments are not limited to the system according to this example configuration. Employment of presence-based history information in conjunction with a notebook application may be implemented in configurations employing fewer or additional components, and performing other tasks. Furthermore, using presence-based history information in a notebook application may be implemented in a similar manner using the principles described herein.

Figure 2:
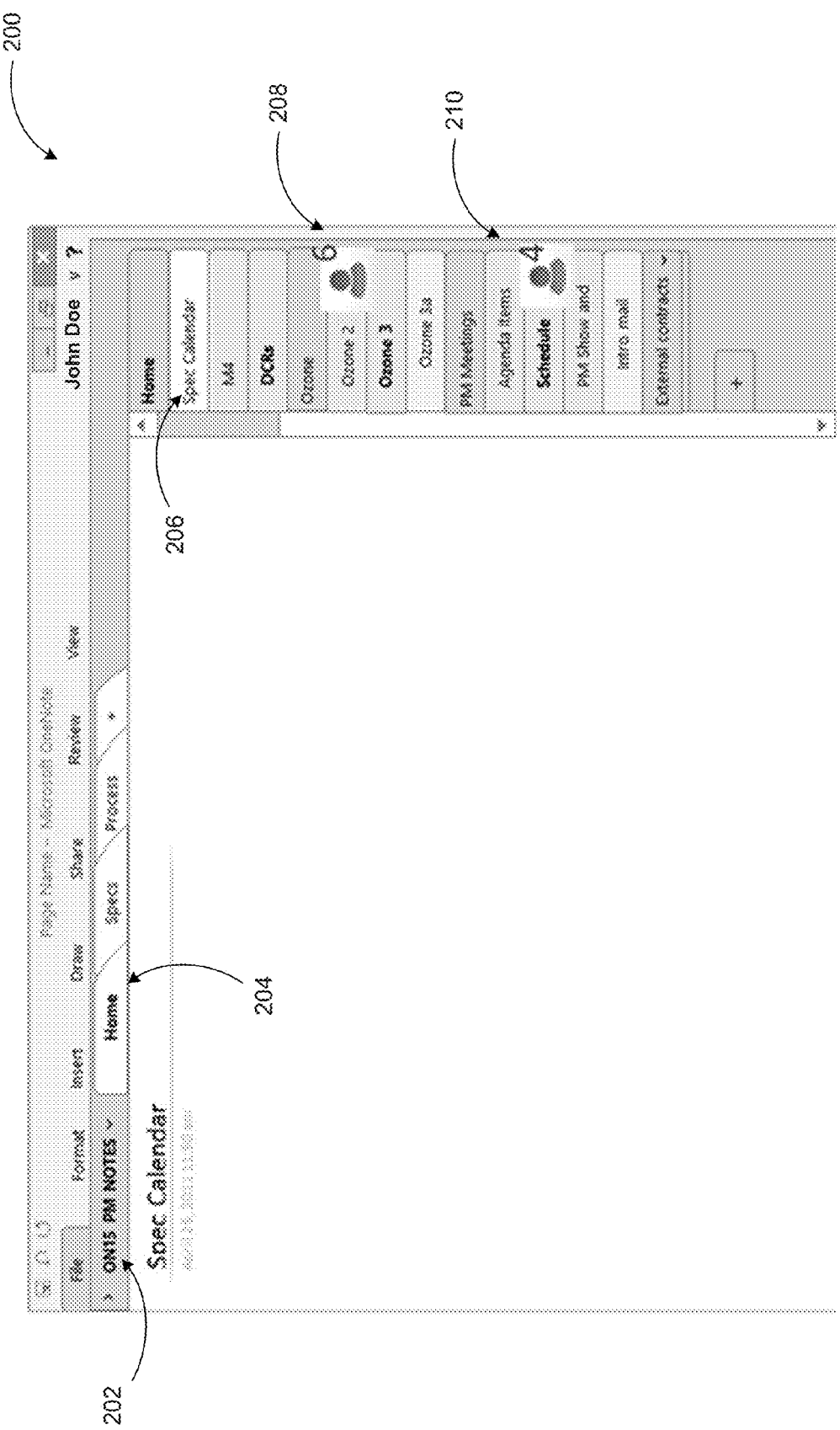
FIG. 2 illustrates an example presentation of presence-based history information in conjunction with contents of a notebook application through a user interface associated with the notebook application.

FIG. 2 illustrates an example presentation of presence-based history information in conjunction with contents of a notebook application through a user interface associated with the notebook application. A notebook application may include a multitude of documents following a common theme that may be organized hierarchically within the notebook application into pages, sections, and/or notebooks. The documents may include spreadsheets, word processing documents, emails, calendars, presentations, embedded video clips, embedded audio clips and any other document. For example, a notebook 202 within the notebook application may include all documents related to a company project. The notebook 202 may have one or more sections 204, such as Home, Specifications, and Process, where documents related to that aspect of the company project are located. The sections 204 may further have one or more pages 206, such as a specifications calendar, a project meeting (PM), agenda terms, and schedule to further group the documents based on more specific aspects of the company project they are related to.

To employ presence-based history information in the notebook application, presence information for users associated with the notebook application may be determined as described in FIG. 1. The notebook application may then track one or more interactions of the users in conjunction with a location within the notebook application, such as a document, an object, a file, a page, a section, and a notebook to record the history information associated with the users. The history information recorded may include a frequency of the interactions, an occurrence of the interactions, and/or a type of the interactions. The types of interactions may include editing, viewing, and/or communicating within a document, object, file, page, section, and/or notebook of the notebook application. The history information may be stored within a data store and retrieved from the data store upon request from the notebook application.

The notebook application may present the history information in conjunction with a location within the notebook application using one or more presentation schemes. For example, a graphical and textual scheme may be employed concurrently, where an icon and a numerical value are positioned above a location within the notebook 202 to represent the number of users that have viewed, performed edits, and/or communicated with one or more other users at the location (e.g., 208, 210). As illustrated by 208, six users have viewed, edited, and/or communicated with one or more other users at a location within a page under the Home section of an example notebook. As illustrated by 210, four users have viewed, edited, and/or communicated with one or more other users at a location within a Schedule page under the Home section of the example notebook. Other schemes such as an audio scheme, an animation scheme, a coloring scheme, a highlighting scheme, and a shading scheme may also be employed in conjunction with a document, an object, a file, a page, a section, and/or a notebook in the notebook application to present the history information. Presence-based history information may further be recorded for users associated with other notebooks in the notebook application and the history information may be presented to the users in a similar manner as discussed above.

In other embodiments, the history information may be presented to the users through a separate user interface. The separate user interface may include the history information in form of a list, a graph, or other similar diagram. The separate user interface may be positioned at any location on the user interface where the location may be pre-determined or defined by the users.

Figure 3A:
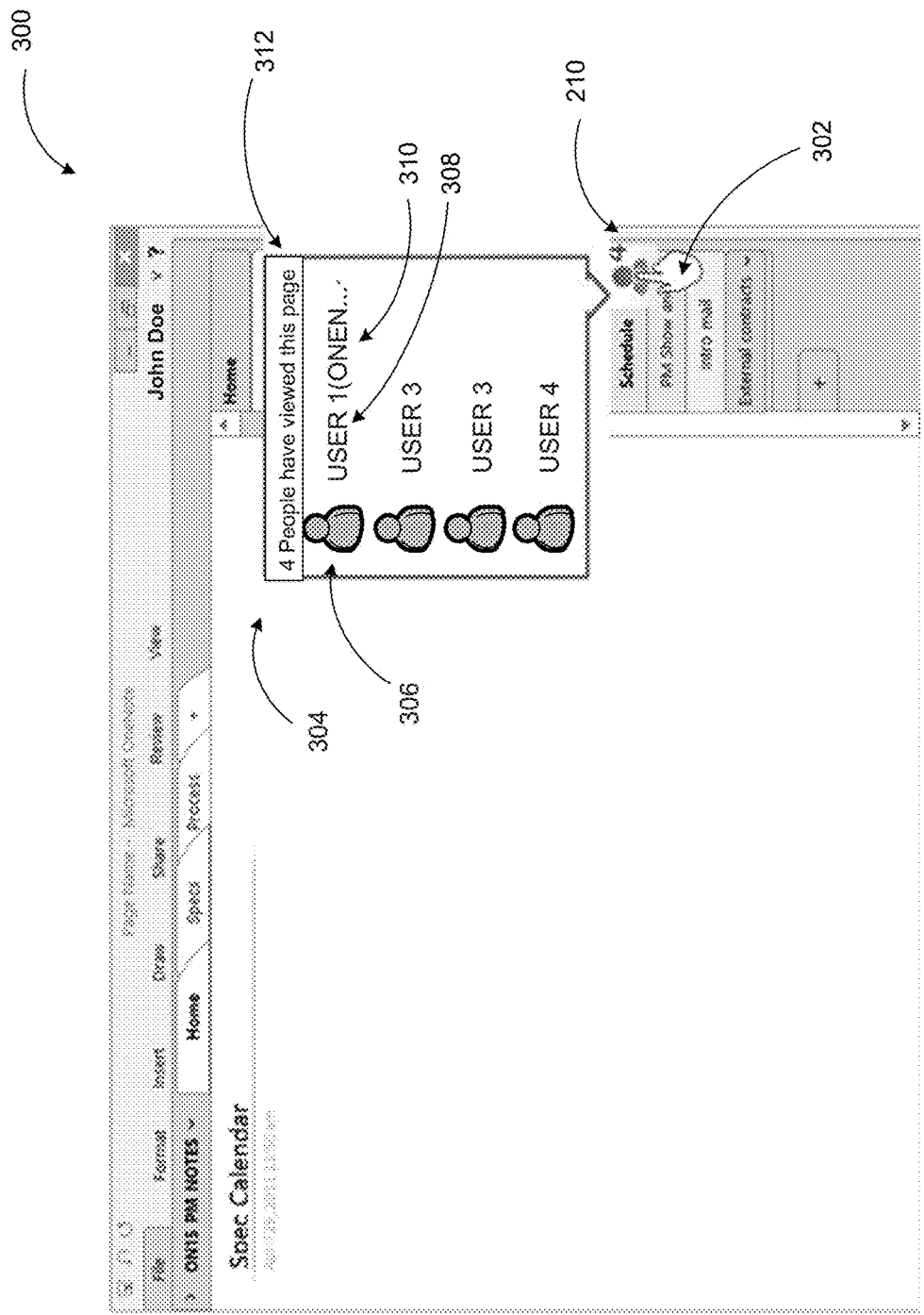
FIGS. 3A-C illustrate example user interactions with the user interface to employ presence-based history information in conjunction with contents of a notebook application.
Figure 3B:
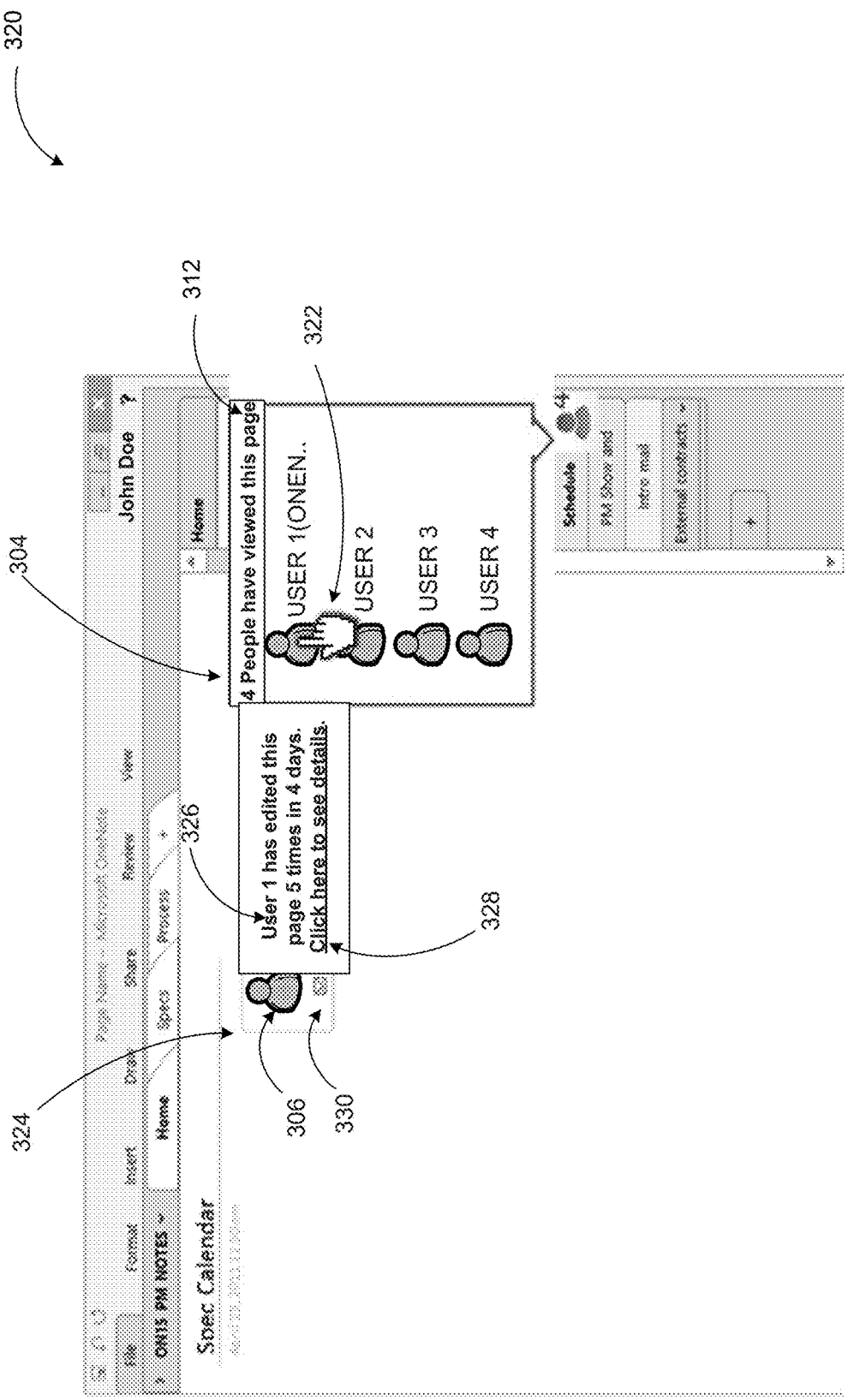
Figure 3C:
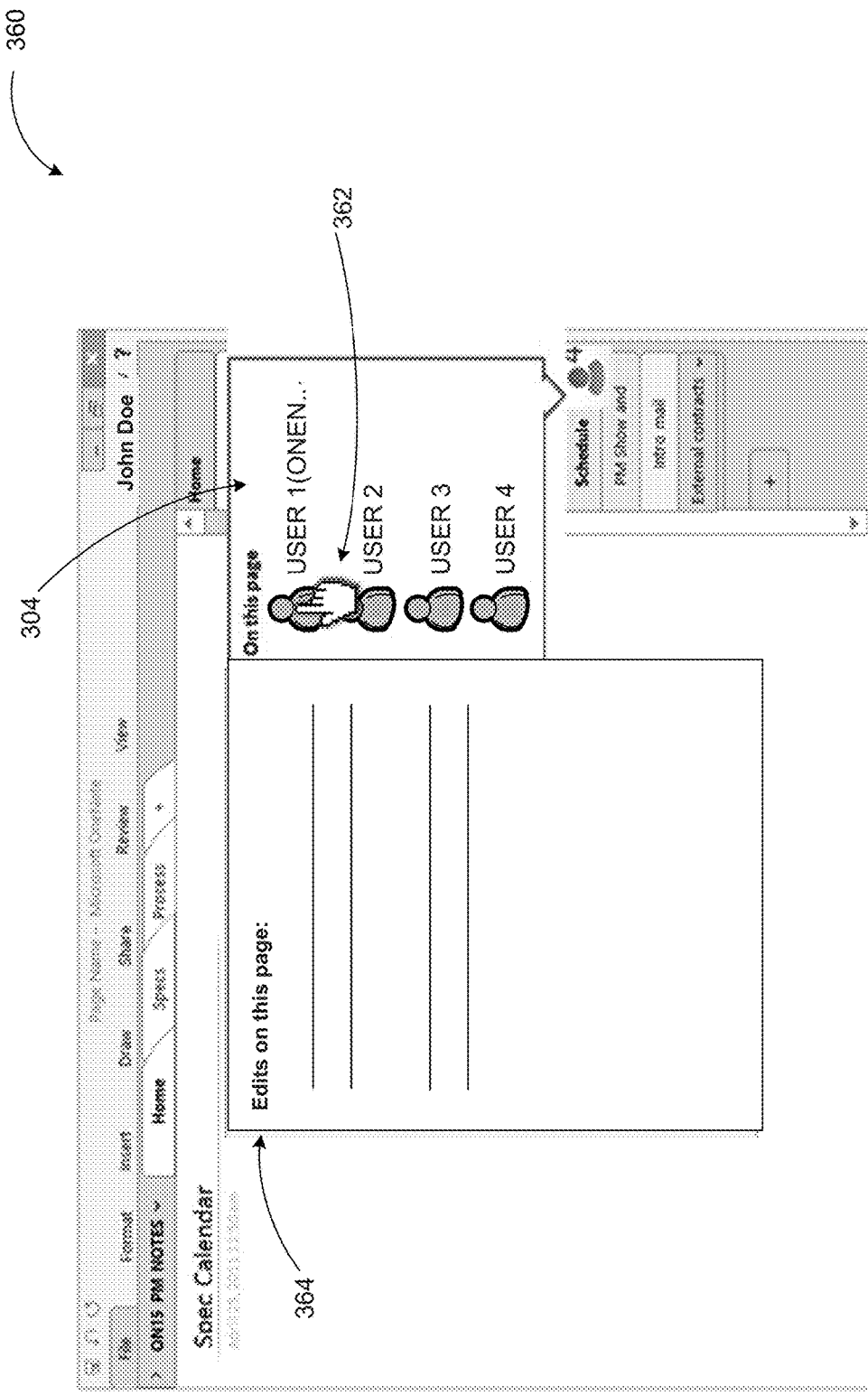

FIGS. 3A-C illustrate example user interactions with a user interface to employ presence-based history information in conjunction with contents of a notebook application. Presence information for users associated with the notebook application may be determined, one or more interactions of the users may be tracked to record history information, and the history information may be presented through a user interface as described above in FIG. 1 and FIG. 2. The users may then be enabled to interact with the history information and contents of the notebook application through the user interface.

A user may interact with the user interface by hovering over or selecting an element using a tap action, a swipe action, a mouse input, a pen input, and/or a keyboard input. By selecting or hovering over elements the user may enable more detailed history information, such as user-specific history information and interaction-specific history information, to be presented. For example, in FIG. 3A, a user may perform a tap action 302 to select the icon 210 that represents four users have viewed, edited, and/or communicated with one or more other users at a location within a Schedule page under the Home section of the example notebook. In response, the notebook application may present a first display element 304 that indicates more detailed history information 312, such as a type of interaction. For example, 4 peopled have viewed this page (e.g., the Schedule page), as illustrated. The first display element 304 may also include a visual identification 306, a textual identification 308, and a location 310 of the users who have viewed the page providing user-specific history information.

For example, in FIG. 3B, the user may then perform a second tap action 322 to select one of the four users listed in the first display element 304. In other embodiments, two or more users may be selected simultaneously. In response, the notebook application may present a second display element 324 that, similar to the first display element 304, includes the visual identification 306 of the selected user. The second display element 324 may also include interaction-specific history information 326 of the selected user. For example, the interaction-specific history information 326 may include an occurrence of edits and a frequency of edits the selected user made to a document, object, file, page, section, and/or notebook within the application. For example, User 1 has edited this page (e.g., the Schedule page) 5 times in 4 days, as illustrated in FIG. B. The second display element may include an actionable link 328 to enable the user to select the link to provide more details on the interaction-specific history information 326.

The second display element 324 may further include one or more icons 330, enabling further interaction with the user interface. The icons upon actuation, for example, may enable a user to initiate communication with the selected user using email, instant message, or call options. The user may also be enabled to schedule a meeting with the selected user.

In another example, as illustrated by FIG. 3C, a user may perform a double tap action 362 to select one or more users from the first display element 304. In response, the notebook application may present a third display element 364, where the third display element 364 may include further interaction-specific history information, such as the types of edits performed by the user on a document, object, file, page, section, and/or notebook within the notebook application. For example, the third display element may list additions, deletions, and/or modifications to the Schedule page made while User 1 was editing the Schedule page, as illustrated in FIG. 3C.

Figure 4:
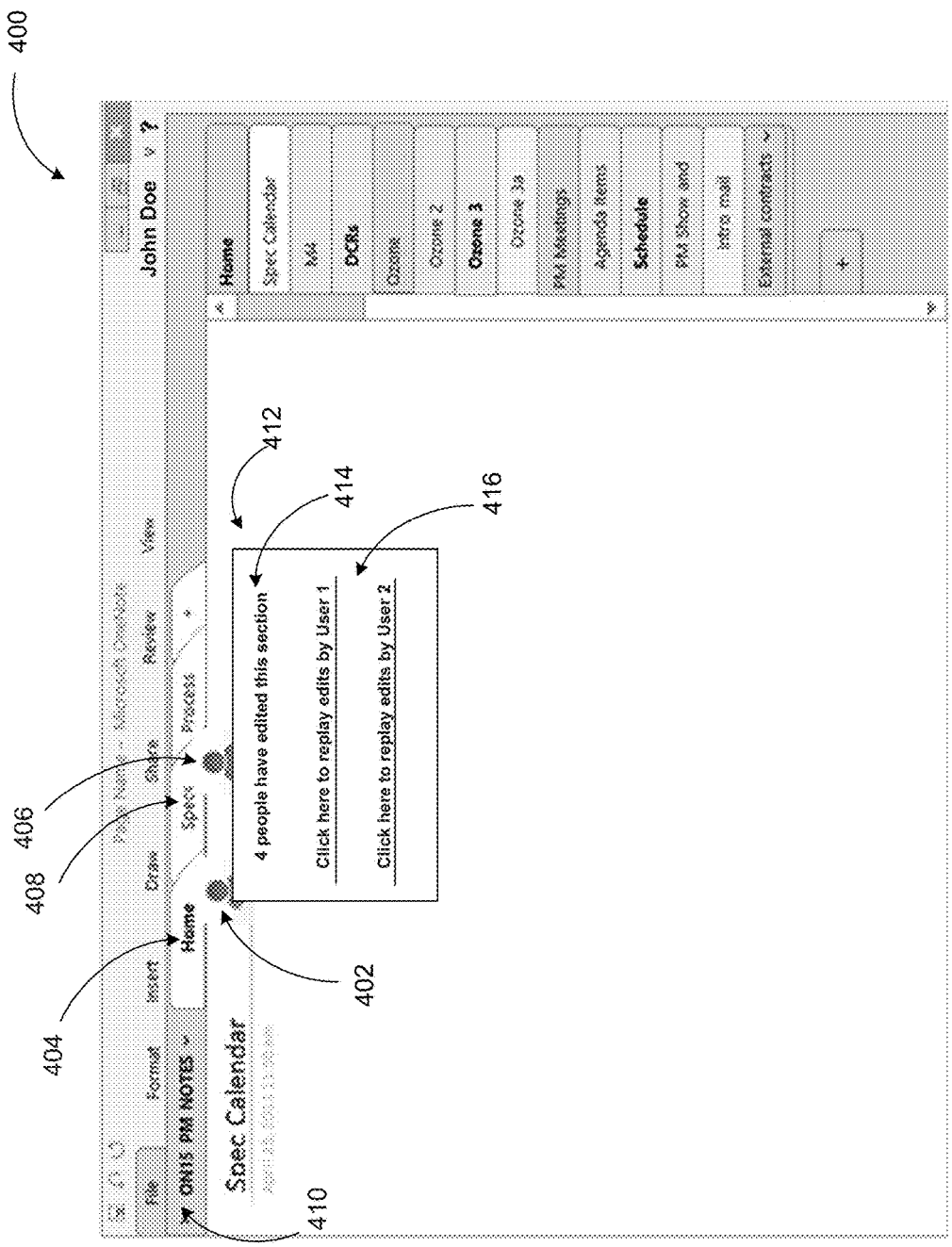
FIG. 4 illustrates another example presentation of presence-based history information in conjunction with contents of a notebook application through a user interface associated with the notebook application enabling replay.

FIG. 4 illustrates another example presentation of presence-based history information in conjunction with contents of a notebook application through a user interface associated with the notebook application enabling replay. In FIG. 4, a graphical scheme may be employed to present the history information through a user interface in conjunction with a location within the notebook application. For example, icons 402 and 406 may indicate that one or more documents and/or a pages within a Home section 404 of an example notebook 410 and one or more documents and/or a pages within a Specs section 408 of the example notebook 410 have been viewed, edited, and/or one or more users have communicated within them, respectively.

The users may hover over or select an icon, such as icon 402, to activate a display element 412 presenting more detailed history information, such as a number of users who have edited a document, object, file, page, section, and/or notebook within the notebook application. For example, as illustrated by 414, 4 users have edited one or more documents and/or a pages within a Home section 404 of the example notebook 410. The display element 412 may further include actionable links to enable a replay of history information associated with one or more users in conjunction with a document, objet, file, page, section, and/or notebook within the notebook application. For example, as illustrated by 416, edits to one or more documents and/or a pages within a Home section 404 of the example notebook 410 made by User 1 or User 2 may be replayed.

The examples in FIG. 1 through 4 have been described with specific systems including specific user interface elements, configurations, and presentations. Embodiments are not limited to systems according to these example configurations. Use of presence-based history information in conjunction with contents maintained by a notebook application may be implemented in configurations using other types of systems including specific user interface elements, configurations, and presentations in a similar manner using the principles described herein.

Figure 5:
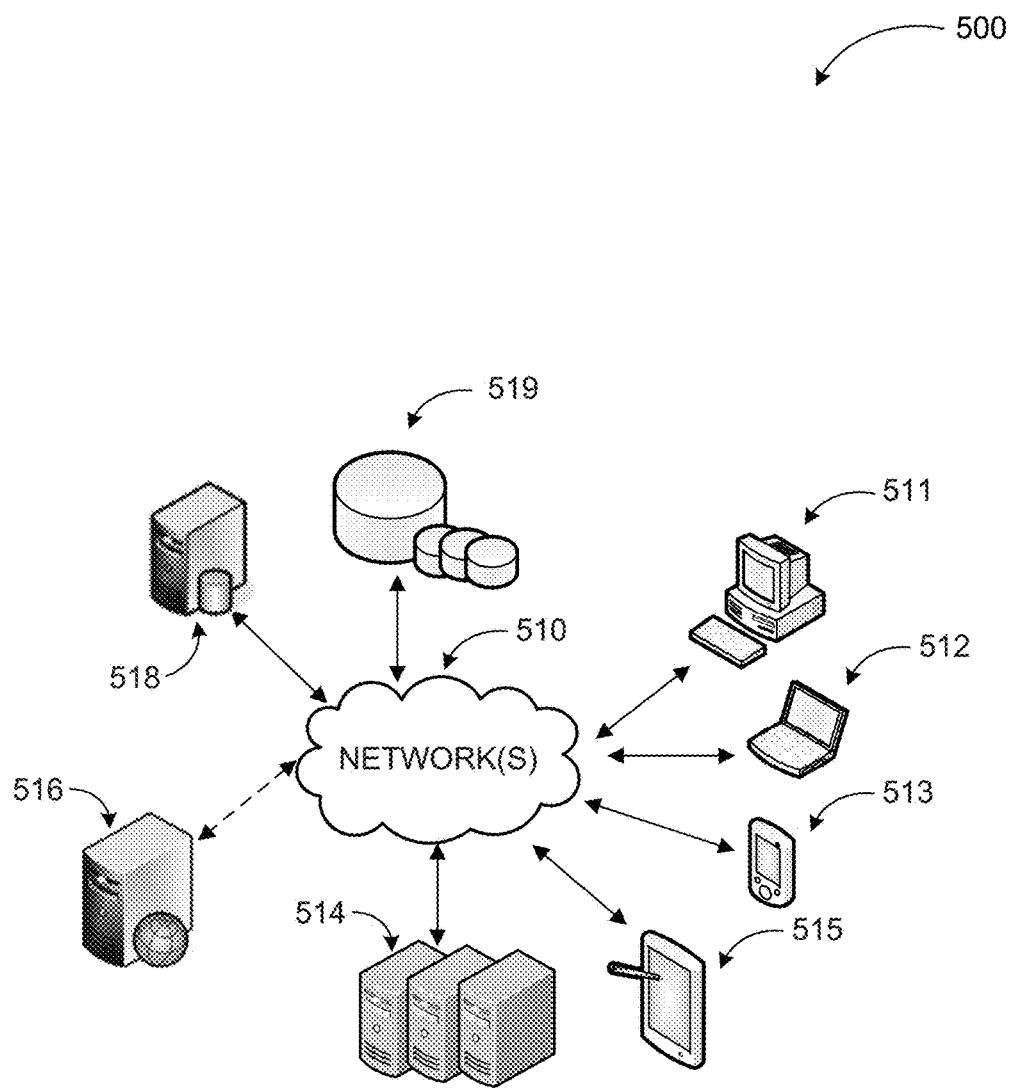
FIG. 5 is a networked environment, where a system according to embodiments may be implemented.

FIG. 5 is an example networked environment, where embodiments may be implemented. A system to employ presence-based history information in a notebook application may be implemented via software executed over one or more servers 514 such as a hosted service. The platform may communicate with client applications on individual computing devices such as a smart phone 513, a tablet computer 515, a laptop computer 512, or desktop computer 511 ('client devices') through network(s) 510.

Client applications executed on any of the client devices 511-513 may facilitate communications via application(s) executed by servers 514, or on individual server 516. A notebook application executed on one of the servers may enable use of presence information. The notebook application may determine presence information of one or more users associated with the notebook application and track one or more interactions of the users in conjunction with a location within the notebook application to record the history information. The notebook application may present the history information to the users through a user interface enabling interaction between the users and the user interface to employ the history information in conjunction with a location within the notebook application. The notebook application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing presence-based history information in conjunction with a notebook application. Furthermore, the networked environments discussed in FIG. 5 are for illustration purposes only. Embodiments are not limited to the example applications, modules, or processes.

Figure 6:
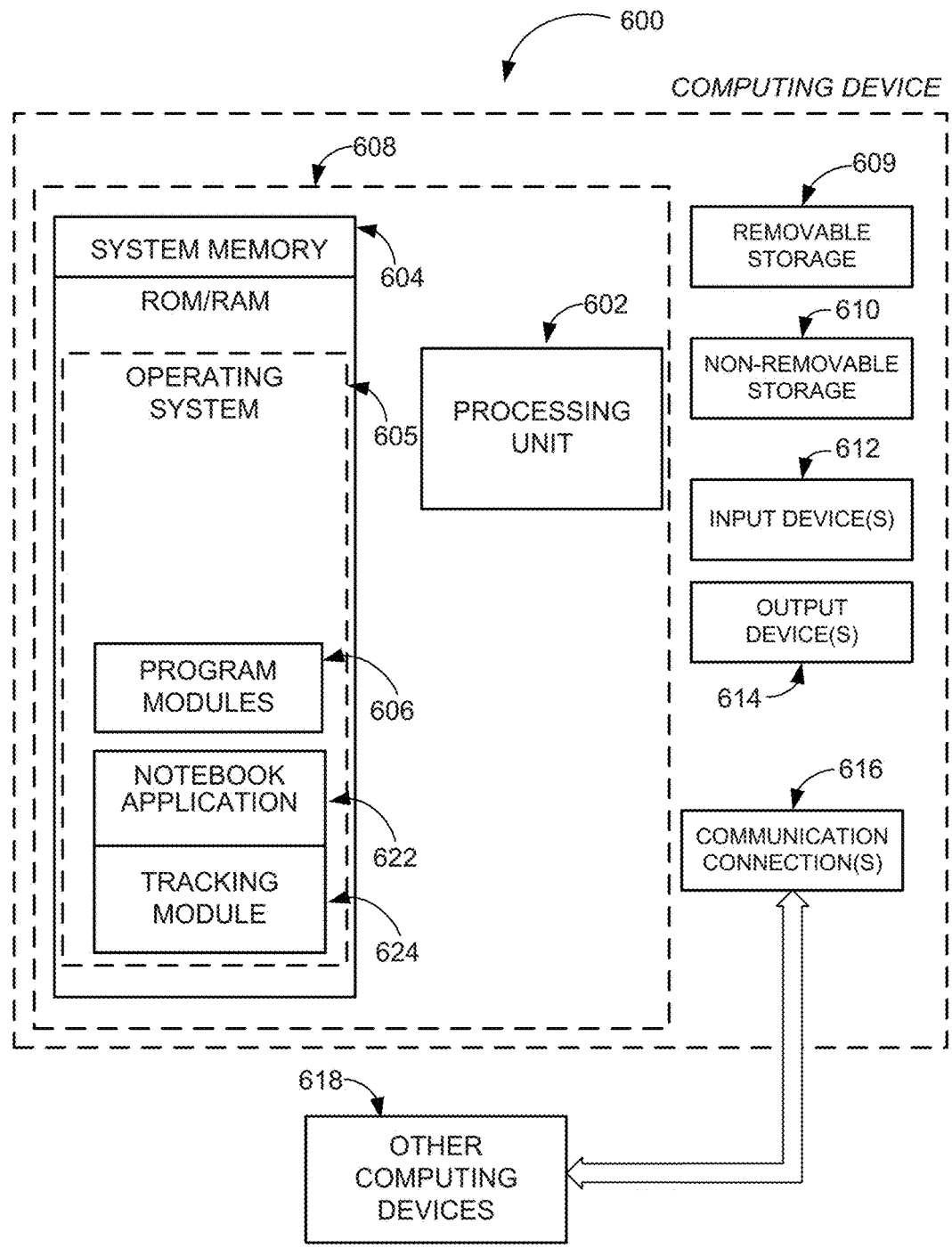
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any portable computing device with wireless communication capabilities, which may include touch and/or gesture detection capability in some examples, and include at least one processing unit 602 and system memory 604. Computing device 600 may also include multiple processing units that cooperate in executing programs. Depending on the exact configuration and type of computing device, the system memory 604 may be volatile (such as RAM), nonvolatile (such as ROM, flash memory, etc.) or some combination of the two. System memory 604 typically includes an operating system 606 suitable for controlling the operation of the platform, such as the WINDOWS®, WINDOWS MOBILE®, WINDOWS RT®, or WINDOWS PHONE® operating systems from MICROSOFT CORPORATION of Redmond, Wash. The system memory 604 may also include one or more software applications such as a notebook application 622, and a tracking module 624.

The notebook application 622 may determine presence information for one or more users associated with the notebook application using a presence module within the notebook application and one or more other presence services. The notebook application 622 may track one or more interactions of the users in conjunction with a location within the notebook application using the tracking module 624 to record history information associated with the users. The notebook application 622 may then present the history information to the users through a user interface and enable the users to interact with the history information through the user interface. The notebook application 622 and tracking module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Some embodiments may be implemented in a computing device that includes a communication module, a memory device, and a processor, where the processor executes a method as described above or comparable ones in conjunction with instructions stored in the memory device. Other embodiments may be implemented as a computer readable memory device with instructions stored thereon for executing a method as described above or similar ones. Examples of memory devices as various implementations of hardware are discussed above.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
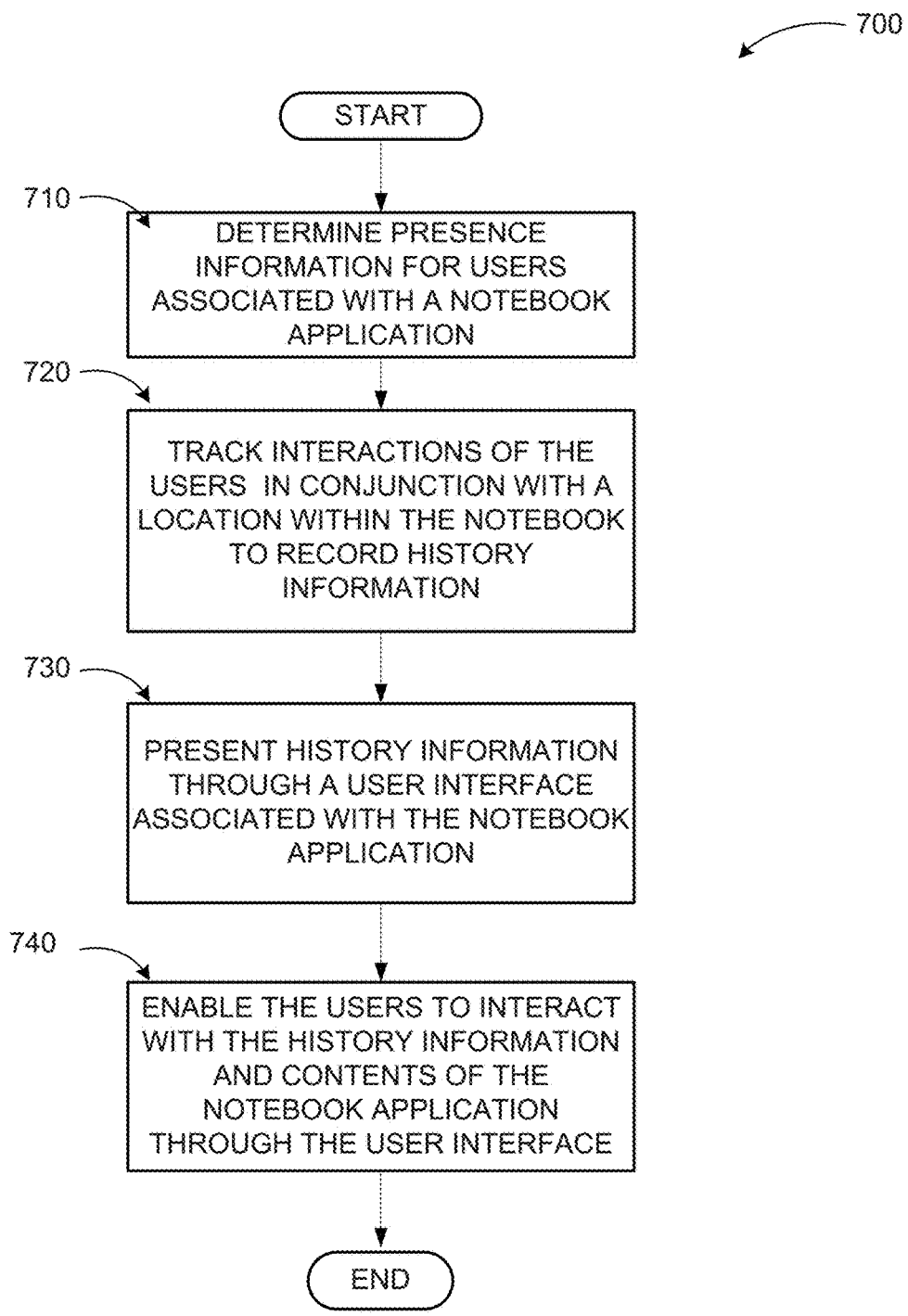
FIG. 7 illustrates a logic flow diagram of a method to employ presence-based historical information in conjunction with contents of a notebook application, according to embodiments.

FIG. 7 illustrates a logic flow diagram for process 700 of a method to employ presence-based historical information in conjunction with contents of a notebook application, according to embodiments according to embodiments. Process 700 may be implemented on a server or other system.

Process 700 begins with operation 710, where a notebook application may determine a presence of one or more users associated with the notebook application. The presence information may be determined by obtaining presence information from one or more presence services. The presence services may include a communication application, a social network, a professional network, and/or a presence module of the notebook application.

At operation 720, the notebook application may track one or more interactions of the users in conjunction with a location within the notebook application to record history information associated with the users. The history information recorded may include a frequency of the interactions, an occurrence of the interactions, and/or a type of the interactions. The types of interactions may include editing, viewing, and/or communicating within a document, page, section, and/or notebook of the notebook application. The history information may be stored at a data store, the data store may be within the notebook application or a separate data store. The history information may be retrieved from the data in response to a request from the notebook application.

At operation 730, the history information may be presented through a user interface in conjunction with a location within the notebook application, such as a document, an object, a file, a page, a section, and/or a notebook, or as a separate user interface. Furthermore, the presence-based history information may be presented using a textual scheme, a graphical scheme, an audio scheme, an animation scheme, a coloring scheme, a highlighting scheme, and/or a shading scheme to enhance the presentation of the presence-based history information in the user interface. The history information presented may further include statistical information based on the recorded history information.

At operation 740, the users may be enabled to interact with the history information and contents of the notebook application through the user interface associated with the notebook application. The users may interact with the user interface by hovering over or selecting an element using a tap action, a swipe action, a mouse input, a pen input, and/or a keyboard input. By selecting or hovering over elements the users may enable more detailed history information, such as user-specific history information and interaction-specific history information, to be presented. Furthermore, the users may be enabled to replay edits made to a document, object, file, page, section, and/or notebook within the notebook application. For example, a user may see additions, deletions, modifications, and/or comments made to a document over time, to view how the document has evolved or changed and to view the key editors of the document.

The operations included in process 700 are for illustration purposes. Employing presence-based history information in conjunction with a notebook application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method, executed at least in part by a computing device, to employ presence-based history information in conjunction with a notebook application, the method comprising:
   determining presence information for one or more users associated with the notebook application, wherein the notebook application includes a plurality of documents, objects, files, pages, sections, and notebooks;
   tracking one or more interactions in conjunction with a location within the notebook application to record history information associated with the location;
   providing the history information to be presented through a user interface of the notebook application, wherein a selectable element is positioned above the location within the notebook application to enable interaction with the presented history information and contents of the notebook application through the user interface; and
   in response to detecting a selection of the element, further providing to be presented a display that includes user-specific history information and interaction-specific history information associated with the location within the notebook application, wherein:
      the user-specific history information includes selectable icons that represent each of the one or more users having interacted in conjunction with the location; and
      the interaction-specific history information includes a list of edits performed by each user represented in the user-specific history information to one or more of the plurality of documents, objects, files, pages, sections, and notebooks at the location within the notebook application.

2. The method of claim 1, wherein determining the presence information comprises:
   obtaining presence information from at least one from a set of: a communication application, a social network, a professional network, and a presence module of the notebook application.

3. The method of claim 1, wherein tracking the one or more interactions in conjunction with a location within the notebook application comprises:
   tracking at least one from a set of: an occurrence of the one or more interactions, a frequency of the one or more interactions, and a type of the one or more interactions.

4. The method of claim 3, wherein the one or more interactions comprise one or more of viewing, editing, and communicating within one or more of a document, an object, a file, a page, a section, and a notebook within the notebook application.

5. The method of claim 1, wherein presenting the history information through the user interface associated with the notebook application comprises one of:
   presenting the history information in conjunction with the location within the notebook application; and
   presenting the history information as a separate user interface.

6. The method of claim 5, wherein presenting the history information through the user interface associated with the notebook application further comprises:
   employing at least one from a set of: a textual scheme, a graphical scheme, an audio scheme, an animation scheme, a coloring scheme, a highlighting scheme, and a shading scheme to enhance presentation of the history information in the user interface.

7. The method of claim 1, further comprising:
   enabling the one or more users to interact with the user interface by one or more of: a tap action, a swipe action, a mouse input, a pen input, and a keyboard input.

8. The method of claim 7, further comprising:
   enabling more detailed history information to be presented in response to a user interaction with the user interface.

9. The method of claim 1, further comprising:
   enabling a replay of edits to one or more of a document, an object, a file, a page, a section, and a notebook within the notebook application based on the history information.

10. The method of claim 1, further comprising:
    tracking one or more interactions in conjunction with one or more users of other notebooks to record history information; and
    presenting the history information of the one or more users of the other notebooks through the user interface associated with the notebook application.

11. The method of claim 1, further comprising:
    enabling the one or more users to set at least one of credential based and permission based limitations to control the history information that is available for presentation to one or more other users.

12. A computing device to employ presence-based history information in conjunction with a notebook application, the computing device comprising:
    a memory;
    a processor coupled to the memory, the processor executing a notebook application and causing a user interface of the notebook application to be presented, wherein the notebook application is configured to:

determine presence information for one or more users associated with the notebook application, wherein the notebook application includes a plurality of documents, objects, files, pages, sections, and notebooks;

track one or more interactions in conjunction with a location within the notebook application to record history information associated with the location;

provide the history information to be presented through the user interface of the notebook application;

enable interaction with the presented history information and contents of the notebook application through the user interface of the notebook application by providing a selectable element positioned above the location within the notebook application; and in response to detecting a selection of the element, further provide to be presented a display that includes user-specific history information and interaction-specific history information associated with the location within the notebook application, wherein:

the user-specific history information includes selectable icons that represent each of the one or more users having interacted in conjunction with the location; and the interaction-specific history information includes a list of edits performed by each user represented in the user-specific history information to one or more of the plurality of documents, objects, files, pages, sections, and notebooks at the location within the notebook application.

13. The computing device of claim 12, wherein the history information is stored in one of a data store within the notebook application and a separate data store.

14. The computing device of claim 13, wherein the history information is retrieved from the separate data store upon a request from the notebook application.

15. The computing device of claim 12, wherein the one or more users are enabled to one of select the element of the user interface and hover over the element of the user interface to interact with the history information and contents of the notebook application.

16. The computing device of claim 12, wherein the recorded history information includes at least one of: an occurrence of views, edits, and communications associated with the one or more users in conjunction with a location within the notebook application; a frequency of views, edits, and communications associated with the one or more users in conjunction with a location within the notebook application; and a type of edits and communications associated with the one or more users in conjunction with a location within the notebook application.

17. The computing device of claim 16, wherein the presented history information further includes statistical information based on the recorded history information.

18. The computing device of claim 17, wherein the statistical information includes one or more of how many times one or more of a document, a page, a section, and a notebook was linked; one or more of a document, an object, a file, a page, a section, and a notebook with most views and edits; an average viewing and editing time for one or more of a document, an object, a file, a page, a section, and a notebook; changes in size of one or more of a document, an object, a file, a page, a section, and a notebook; and age of one or more of a document, an object, a file, a page, a section, and a notebook.

19. A computer-readable memory device with instructions stored thereon to employ presence-based history information in conjunction with a notebook application, the instructions comprising:

determining presence information for one or more users associated with the notebook application, wherein the notebook application includes a plurality of documents, objects, files, pages, sections, and notebooks;

tracking one or more interactions in conjunction with a location within the notebook application to record history information associated with the location;

providing the history information to he presented through a user interface of the notebook application, wherein the presented history information includes the recorded history information and statistical information based on the recorded history information;

enabling interaction with the history information and contents of the notebook application based on the presented history information through the user interface of the notebook application by displaying an element comprising at least one selectable icon and associated numerical value positioned above the location within the notebook application, wherein the numerical value represents a number of users that have one of viewed, performed edits, and communicated with one or more other users at the location; and in response to detecting a selection of the element, further presenting a display that includes user-specific history information and interaction-specific history information associated with the location within the notebook application, wherein:

the user-specific history information includes additional icons that represent each of the one or more users having interacted in conjunction with the location and are selectable to initiate communication with selected users; and the interaction-specific history information includes a list of edits performed by each user represented in the user-specific history information to one or more of the plurality of documents, objects, files, pages, sections, and notebooks at the location within the notebook application.

20. The computer-readable memory device of claim 19, wherein a user is enabled to define the history information presented to the user through the user interface.

* * * * *